(12) United States Patent
Cope

(10) Patent No.: US 7,747,277 B1
(45) Date of Patent: Jun. 29, 2010

(54) TERMINATION ROUTING BASED ON LNP REDIRECTION

(75) Inventor: Warren B. Cope, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1038 days.

(21) Appl. No.: 11/049,142

(22) Filed: Feb. 1, 2005

(51) Int. Cl.
*H04Q 7/20* (2006.01)

(52) U.S. Cl. .......... 455/552.1; 455/422.1; 455/403; 455/417; 455/445; 455/414.1; 379/201.01; 379/221.09; 379/221.13

(58) Field of Classification Search .......... 455/552.1, 455/550.1, 551, 445, 417, 422.1, 403, 414.1, 455/414.2, 414.3, 432.1, 432.2, 435.1, 435.2, 455/412.1, 412.2, 426.1, 426.2, 73, 433; 379/201.01, 221.09, 221.13
See application file for complete search history.

(56) References Cited

U.S. PATENT DOCUMENTS

| | | | | |
|---|---|---|---|---|
| 5,883,948 A | * | 3/1999 | Dunn | 379/221.09 |
| 6,134,314 A | * | 10/2000 | Dougherty et al. | 379/201.01 |
| 6,922,468 B1 | * | 7/2005 | Dammrose et al. | 379/221.13 |
| 7,139,558 B1 | * | 11/2006 | Palviainen | 455/417 |
| 2002/0137498 A1 | * | 9/2002 | Goss et al. | 455/417 |
| 2004/0005891 A1 | * | 1/2004 | Yu et al. | 455/428 |
| 2004/0235482 A1 | * | 11/2004 | Sylvain | 455/445 |
| 2006/0148458 A1 | * | 7/2006 | Komaria et al. | 455/415 |
| 2007/0037571 A1 | * | 2/2007 | Begeja et al. | 455/426.1 |

FOREIGN PATENT DOCUMENTS

EP   1041796 A2 * 10/2000

* cited by examiner

*Primary Examiner*—Keith T Ferguson

(57) ABSTRACT

A system and method for redirecting incoming calls is disclosed. When the status of a wireless or mobile phone meets a predetermined condition or set of conditions, the LNP database is updated to redirect an incoming call to a phone number, such that the incoming call is redirected to the wireless or mobile phone.

37 Claims, 2 Drawing Sheets

TERMINATION ROUTING BASED ON LNP REDIRECTION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures and services.

2. Description of the Prior Art

The prevalence of wireless phones has increased dramatically in recent years. Wireless phones may also be known as mobile phones. Some examples of wireless phones are cell phones and PCS phones. As the number of these types of phones has increased, the ability to reach people at almost any location has also increased. Many people still have non-wireless phones. Some communication systems offer to redirect an incoming call to a non-wireless phone such that the call is routed to a mobile or wireless phone under certain conditions. For example, when a non-wireless phone is not answered within a predetermined number of rings, the call is redirected to a wireless number. Some communication systems redirect the incoming call whenever the wireless phone is turned on. To enable this type of redirection, a class 5 switch may be required. The call may also be required to originate or terminate within the communication system that controls the wireless phone. These requirements are limiting access to this useful feature.

The Local Number Portability (LNP) database is currently used to allow users to keep their phone number when they switch to a different phone service provider or to a different physical location. The way the LNP system works is that there is a national database (called the LNP database) that contains a network address for each phone. When a phone number is called, a phone company looks into the database (called a dip) and retrieves the network address for the called number. Using the network address, the phone company can determine the proper route for the call. When a user changes service providers or physical locations, the LNP database is updated with the network address for their new service provider or new location. By updating the database, a call to the user's phone number will be redirected or routed to the phone that corresponds to the new network address. Currently the LNP database is typically only used when a customer changes service providers or physical locations.

Therefore there is a need for a system and method for redirecting incoming calls using the LNP database.

SUMMARY OF THE INVENTION

A system and method for redirecting incoming calls is disclosed. When the status of a wireless or mobile phone meets a predetermined condition or set of conditions, the LNP database is updated to redirect an incoming call to a phone number, such that the incoming call is redirected to the wireless or mobile phone.

DETAILED DESCRIPTION OF THE PREFERRED EMBODIMENT

Figure 1:
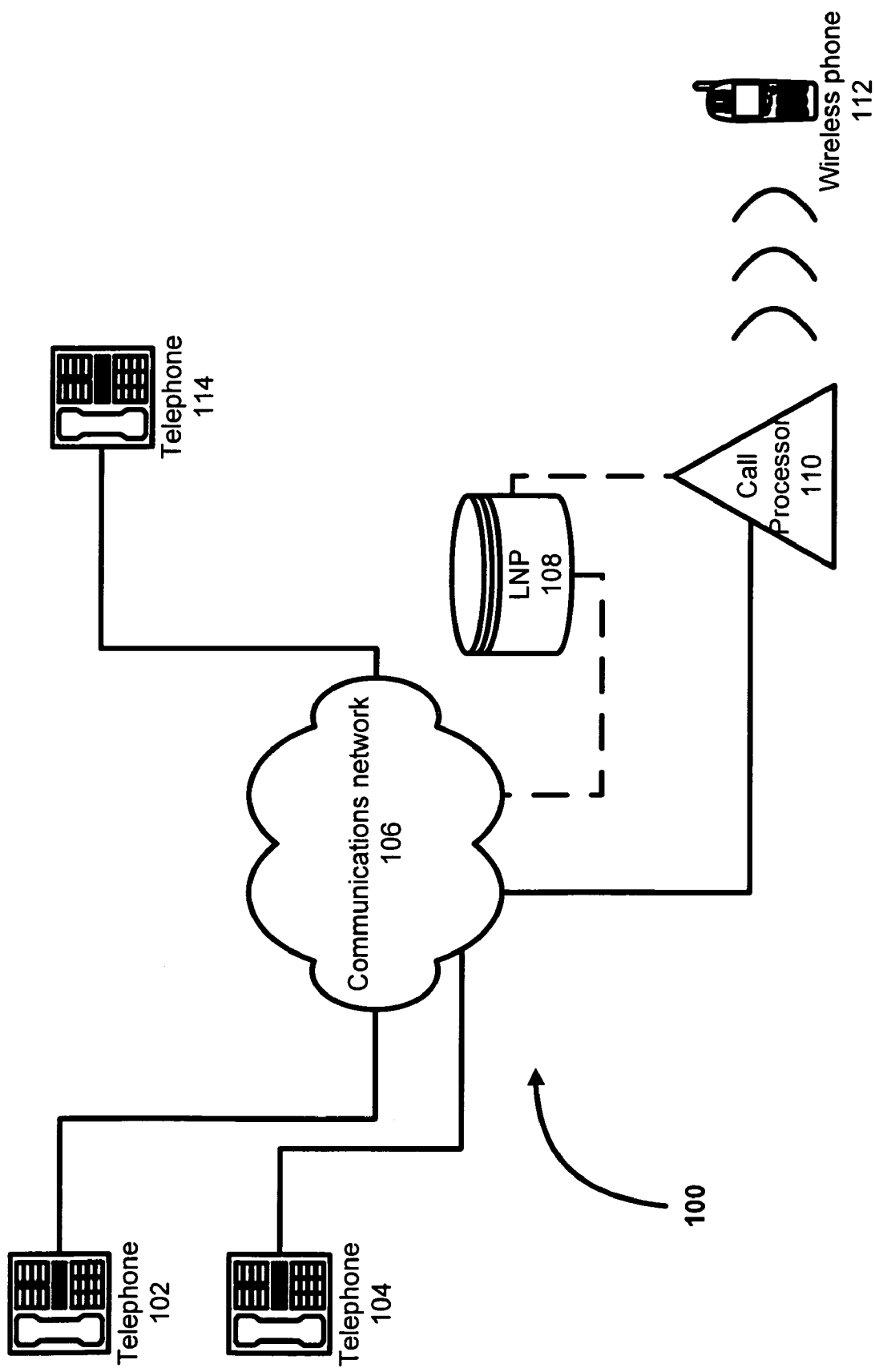
FIG. 1 is a block diagram of a communication system used in one example embodiment of the current invention.
Figure 2:
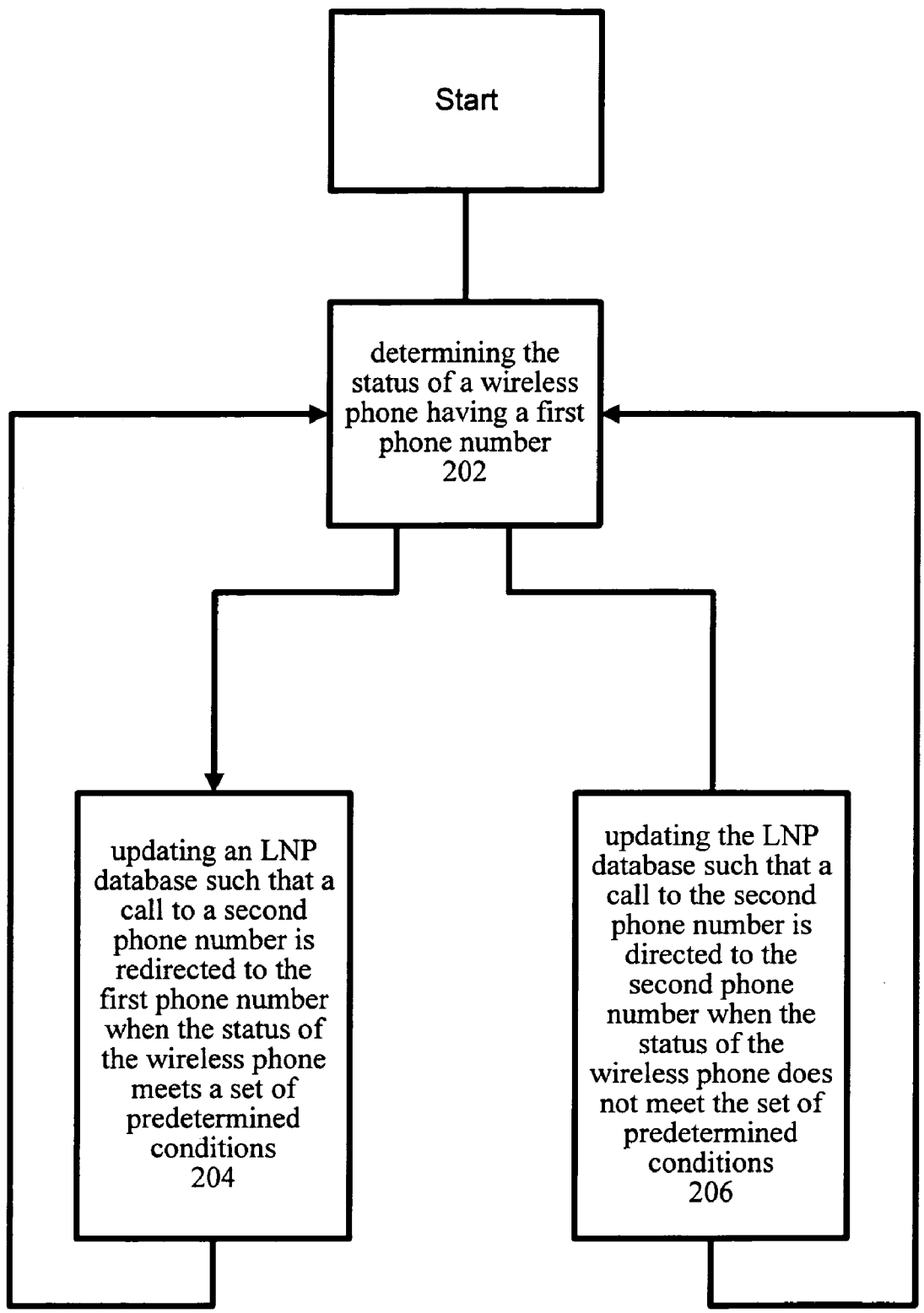
FIG. 2 is a flow chart for a method of redirecting a call using an LNP database in one example embodiment of the current invention.

FIGS. 1-2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 is a block diagram of communication system 100 used in one example embodiment of the current invention. Communication system 100 includes phones 102, 104 and 114, communications network 106, call processor 110, wireless phone 112, and Local Number Portability (LNP) database 108. Telephones 102, 104 and 114 are connected to communications network 106. Call processor 110 is connected to communications network 106. Call processor 110 communicates with wireless phone 112. Call processor 110 communicates with LNP database 108. Communications network 106 is in communications with LNP database 108. Communications network 106 may be the Public Switched Telephone network (PSTN), a Voice over Internet Protocol (VoIP) network, or a combination of different communication systems. Call processor 110 may be a mobile switching center, a signaling processor, or the like.

In operation, when phone 102 dials the phone number for phone 114, communications system 106 will dip LNP 108 to determine what route to use to reach phone 114. LNP will indicate the correct route such that communications network 106 will terminate the call at phone 114. Call processor 110 monitors the status of wireless phone 112. When call processor 110 detects that the status of mobile phone 112 meets a predetermined set of conditions, call processor 110 will update LNP 108 such that a call to phone 114 will be redirected to wireless phone 112. Once the update to LNP 108 has occurred, communication system 106 will operate as follows: when phone 102 dials the phone number for phone 114, communications network will dip LNP 108 to determine what route to use to reach phone 114. LNP will indicate that communications network should connect to call processor 110. Call processor 110 will terminate the call to wireless phone 112. Call processor will continue to monitor the status of mobile phone 112. When the status of mobile phone 112 no longer meets the predetermined conditions, the LNP database will be updated to redirect calls to phone 114 such that the calls will once again terminate at phone 114.

In one example embodiment of the invention, the status of the wireless phone 112 may be checked periodically by call processor 110, for example using a polling technique. In another example embodiment the status would be updated only when a change in the status was detected, for example when phone 112 was turned on/off.

FIG. 1 shows telephone 102 and 114 as a non-wireless phones, however phones 102 and 114 could be any type of phone.

FIG. 2 is a flow chart for a method of redirecting a call using a Local Number Portability (LNP) database in one example embodiment of the current invention. At step 202 the status of a wireless or mobile phone is determined. When the status of the wireless phone meets a predetermined set or sets of conditions, a Local Number Portability (LNP) database is updated such that a call to a first number is redirected to the wireless or mobile phone (step 204). When the status of the wireless phone does not meet the predetermined set or sets of conditions, the LNP database is updated to terminate the call for the first number at the first number, and not at the mobile or wireless phone (step 206).

In a preferred embodiment of the invention the Local Number Portability (LNP) database is the national database for number portability. By using the nationally based LNP database, a phone call from any communication system that does an LNP dip can be redirected to a different number. Of course local versions or copies of the National LNP database may be used with this invention.

The status detected in step 202 can be one or a plurality of different conditions. One type of status that can be determined is whether the phone is turned on. When the phone is on, the LNP database would be updated such that a call to another number, for example an office number, would be redirected to the wireless phone. When the wireless phone was off, the LNP database would be updated to allow the call to the office number to go through to the office phone. Using this system a person could still answer their office phone even while away from the office. Another advantage is that the user would not have to give out his mobile number, but still could be reached when away from the office. Many of the examples used to describe this invention have an office phone number as the phone number being redirected to the wireless phone. The office phone is used in the examples to help clarify which phone number is being redirected. The invention is not limited to redirecting an office phone, any phone number and any type of phone can be redirected using this invention.

Redirecting the office number may be dependent on other condition. For example, during non-business hours, the user may want a call to the office number to be received by the office phone, even when the wireless phone was on. One of the predetermined conditions may be the time of day. When a call is directed to the office number, the current time of day is compared to a range of times, for example office hours. If the current time of day is not within the range of times, then the call will be sent to the office number, even when the wireless phone is on. Another conditions may be the day of the week, for example the incoming call will only be redirected during a week day. Another condition may be the day of the year, for example the user may not wish to have calls to their office redirected on a holiday.

Another type of status that can be detected is the geographic location of the wireless phone. When the phone is on and within a predetermined area, a call to another number may be redirected to the wireless phone. In another example embodiment of the current invention, the call may be redirected only when the wireless phone is not located within a predetermined location.

The quality of the reception may also be an important consideration when deciding when to redirect a call. One type of status that can be monitored is when the mobile phone is using analog vs. digital signals. When the phone is only able to use analog signals, the call may be allowed to terminate at the called number and not be redirected to the mobile phone.

Cost may also be a consideration. When the wireless phone is on but not roaming, the call to the other number would be redirected to the wireless phone. When the wireless phone is on but roaming, the call to the other number would be terminated at the other number.

The redirect feature may be user controllable. For example, the user may be able to enable/disable the feature by a code. The code could be entered into the phone using the phone keys, or even using a voice command. In this way the user could enable or disable the redirect feature without re-programming the other predetermined conditions (if any). In one example embodiment of the invention, the default is for the redirect feature to be disabled. Once a user has turned on their wireless phone, they would need to enable the redirect feature by entering a code into their phone. Once the redirect feature had been enabled, the LNP database would be updated (assuming any other predetermined conditions were also met).

In one example embodiment of the invention, the status of the wireless phone may be checked periodically, for example using a polling technique. In another example embodiment the status would be updated only when a change in the status was detected, for example when the phone was turned on/off. Another example of monitoring status only when a change may occur is checking the day of the week or day of the year only at the start of a new day.

A plurality of different number may be redirected to a single wireless phone. Using this feature of the invention a single person could answer multiple phones, for example covering all the phones in an office during the weekend.

I claim:

1. A method, comprising:
    determining a status of a wireless phone where the wireless phone has a first phone number;
    updating a Local Number Portability (LNP) database such that a call to a second phone number is redirected to the first phone number when the status of the wireless phone meets a set of predetermined conditions;
    monitoring an ability of the wireless phone to use a plurality of types of signals; and
    updating the LNP database such that a call to the second phone number is directed to the second phone number when the wireless phone is able to use only a one of the plurality of types of signals.

2. The method of claim 1 where the status is determined periodically, and wherein the plurality of types of signals comprise analog and digital.

3. The method of claim 2 wherein the one of the plurality of types of signals comprises an analog signal.

4. The method of claim 1 where a first one of the set of predetermined conditions is that the wireless phone is on.

5. The method of claim 4 where a second one of the set of predetermined conditions is that the LNP update has been enabled.

6. The method of claim 4 further comprising:
    determining a current time of day, where a second one of the set of predetermined conditions is that the current time of day is in a predetermined range of times.

7. The method of claim 6 where the predetermined range of times is during business hours.

8. The method of claim 6 where the predetermined range of times is from 8:00 am until 5:00 pm.

9. The method of claim 4 further comprising:
determining a current day of the week, where a second one of the set of predetermined conditions is that the current day of the week is in a predetermined range of days of the week.

10. The method of claim 9 where the predetermined range of days of the week is Monday through Friday.

11. The method of claim 4 further comprising:
determining a current geographic location of the wireless phone, where a second one of the set of predetermined conditions is that the geographic location is within a predetermined geographic area.

12. The method of claim 4 where a second one of the set of predetermined conditions is that the wireless phone is not roaming.

13. The method of claim 1 further comprising:
determining a current day of the year, where a second one of the set of predetermined conditions is that the current day of the year is not a predetermined day of the year.

14. The method of claim 13 where the predetermined day of the year is a holiday.

15. The method of claim 1 further comprising:
updating the LNP database such that a call to a plurality of phone numbers is redirected to the first phone number when the status of the wireless phone meets the set of predetermined conditions;
updating the LNP database such that a call to the plurality of phone numbers is directed to the plurality of phone numbers when the status of the wireless phone does not meet the set of predetermined conditions.

16. The method of claim 1 further comprising:
determining a current day of the week;
determining a current time of the day;
where the set of predetermined conditions is that the wireless phone is on and that the current time of day and current day of the week is a week day during business hours.

17. The method of claim 1 where the LNP database is the shared national LNP database.

18. An apparatus, comprising:
a wireless phone having a first phone number;
a call processor (CP) configured to monitor a status of the wireless phone and configured to monitor an ability of the wireless phone to use a plurality of types of signals;
a Local Number Portability (LNP) database;
the CP is configured to update the LNP database, when the status of the wireless phone meets a set of predetermined conditions, such that a call to a second phone number is redirected to the first phone number, and configured to update the LNP database such that a call to the second phone number is directed to the second phone number when the wireless phone is able to use only a one of the plurality of types of signals.

19. The apparatus of claim 18 where the status is determined periodically, and wherein the plurality of types of signals comprise analog and digital.

20. The apparatus of claim 19 wherein the one of the plurality of types of signals comprises an analog signal.

21. The apparatus of claim 18 where a first one of the set of predetermined conditions is that the wireless phone is on.

22. The apparatus of claim 21 where a second one of the set of predetermined conditions is the LNP update has been enabled.

23. The apparatus of claim 21 where the CP is configured to determine a current time of the day and where a second one of the set of predetermined condition is that the current time of the day is in a predetermined range of times.

24. The apparatus of claim 23 where the predetermined range of times is during business hours.

25. The apparatus of claim 23 where the predetermined range of times is from 8:00 am until 5:00 pm.

26. The apparatus of claim 21 where the CP is configured to determine a current day of the week and where a second one of the set of predetermined conditions is that the current day of the week is in a predetermined range of days of the week.

27. The apparatus of claim 21 where the predetermined range of days of the week is Monday through Friday.

28. The apparatus of claim 21 where the CP is configured to determine a current geographic location of the wireless phone and where a second one of the set of predetermined conditions is that the geographic location is within a predetermined geographic area.

29. The apparatus of claim 21 where a second one of the set of predetermined conditions is that the wireless phone is roaming.

30. The apparatus of claim 21 where the CP is configured to determine a current day of the year where a second one of the set of predetermined conditions is that the current day of the year is not a predetermined day of the year.

31. The apparatus of claim 30 where the predetermined day of the year is a holiday.

32. The apparatus of claim 18 where the CP is configured to update the LNP database such that a call to a plurality of phone numbers is redirected to the first phone number when the status of the wireless phone meets the set of predetermined conditions; and
where the CP is configured to update the LNP database such that a call to the plurality of phone numbers is directed to the plurality of phone numbers when the status of the wireless phone does not meet the set of predetermined conditions.

33. The apparatus of claim 18 where the CP is configured to determine a current day of the week and a current time of the day and where set of predetermined conditions is that the wireless phone is on and that the current time of day and current day of the week is a week day during business hours.

34. The apparatus of claim 18 where the LNP data base is the shared national LNP database.

35. The apparatus of claim 18 where the second phone number is to a non-wireless phone.

36. The apparatus of claim 18 where the CP is a mobile switching center (MSC).

37. An apparatus, comprising:
a means for monitoring a status of a wireless phone having a first phone number and for monitoring an ability of the wireless phone to use a plurality of types of signals;
a means for updating a national Local Number Portability (LNP) database such that a call to a second phone number is redirected to the first phone number when the status of the wireless phone meets a set of predetermined conditions, and for updating the LNP database such that a call to the second phone number is directed to the second phone number when the wireless phone is able to use only a one of the plurality of types of signals.

* * * * *